US008650653B2

(12) United States Patent
Poornachandran et al.

(10) Patent No.: US 8,650,653 B2
(45) Date of Patent: Feb. 11, 2014

(54) TRUSTED GRAPHICS RENDERING FOR SAFER BROWSING ON MOBILE DEVICES

(75) Inventors: Rajesh Poornachandran, Beaverton, OR (US); Selim Aissi, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 482 days.

(21) Appl. No.: 12/647,036

(22) Filed: Dec. 24, 2009

(65) Prior Publication Data

US 2011/0161667 A1 Jun. 30, 2011

(51) Int. Cl.
*H04L 9/32* (2006.01)

(52) U.S. Cl.
USPC ........ 726/26; 726/2; 726/16; 726/17; 726/27; 713/168; 709/224; 709/225

(58) Field of Classification Search
USPC .................. 726/2–4, 16–17, 26–27; 713/168; 709/224–225
See application file for complete search history.

(56) References Cited

U.S. PATENT DOCUMENTS

| | | | |
|---|---|---|---|
| 6,216,228 B1 * | 4/2001 | Chapman et al. | 713/176 |
| 7,900,135 B2 * | 3/2011 | Edlund et al. | 715/234 |
| 8,019,689 B1 * | 9/2011 | Nachenberg | 705/64 |
| 8,079,087 B1 * | 12/2011 | Spies et al. | 726/26 |
| 2005/0228980 A1 * | 10/2005 | Brokish et al. | 713/2 |
| 2006/0021031 A1 | 1/2006 | Leahy et al. | |
| 2006/0253583 A1 * | 11/2006 | Dixon et al. | 709/225 |
| 2006/0277605 A1 | 12/2006 | Curtis et al. | |
| 2007/0088959 A1 | 4/2007 | Cox et al. | |
| 2007/0130327 A1 * | 6/2007 | Kuo et al. | 709/224 |
| 2008/0066074 A1 * | 3/2008 | Nutter et al. | 718/107 |
| 2008/0192928 A1 | 8/2008 | Yu et al. | |
| 2009/0132509 A1 | 5/2009 | Nagoya | |
| 2009/0205053 A1 | 8/2009 | Sriram et al. | |
| 2009/0254986 A1 * | 10/2009 | Harris et al. | 726/17 |
| 2009/0300768 A1 | 12/2009 | Krishnamurthy et al. | |

FOREIGN PATENT DOCUMENTS

| | | |
|---|---|---|
| EP | 1868103 A1 | 12/2007 |
| JP | 2007179206 | 12/2005 |
| JP | 2006313517 | 11/2006 |

(Continued)

OTHER PUBLICATIONS

European Search report received for the European Patent Application No. 10196929.3, mailed on May 23, 2011, 5 pages.

(Continued)

*Primary Examiner* — Yin-Chen Shaw
(74) *Attorney, Agent, or Firm* — Grossman, Tucker, Perreault & Pfleger, PLLC (57) ABSTRACT

The present disclosure describes a method and apparatus for determining a safety level of a requested uniform resource locator (URL) on a mobile device. Secure memory may be configured to host at least one database comprising a plurality of uniform resource locators (URLs) and to also host information representing at least one logo indicative of a safety level of the URLs in the database. Secure circuitry may be configured to compare a requested URL with the database to determine if the requested URL corresponds to one of the URLs of the database and to select an appropriate logo stored in the secure memory. The secure circuitry may be further configured to direct overlay circuitry to blend the appropriate logo onto rendered data from a frame buffer video memory for display to a user.

21 Claims, 5 Drawing Sheets

(56) References Cited

FOREIGN PATENT DOCUMENTS

| | | |
|---|---|---|
| JP | 2008269096 | 11/2008 |
| JP | 2009238155 | 10/2009 |
| KR | 1020070006559 | 11/2007 |
| WO | 2007/007988 A2 | 1/2007 |
| WO | WO 2007007988 * | 1/2007 |
| WO | 2008139957 | 11/2008 |

OTHER PUBLICATIONS

Barth, et al., "The Security Architecture of the Chromium Browser", Published in 2008, pp. 1-10.

"Hardware Overlay Support (Windows)", retrieved on Dec. 28, 2009, available at: http://msdn.microsoft.com/en-us/library/dd797814(VS.85,printer).aspx.

Porter, et al., "Compositing Digital Images", Computer Graphics, vol. 18, No. 3, Jul. 1984, pp. 253-259.

Smith "Image Compositing Fundamentals" Microsoft Technical Memo 4, vol. 4.15, Published on Aug. 15, 1995, 8 Pages.

Chinese Office Action from related application CN201010625053.4 mailed Mar. 5, 2013.

European Office Action from related European Patent Application No. 10196929.3, mailed on May 23, 2013.

Korean Office action from related Korean Application 1-2010-134786, dated Aug. 16, 2012, 6 pages.

Japanese Office Action from related case JP2010-281689 mailed Nov. 20, 2012.

Chinese Office Action from related application CN201010625053.4 mailed Oct. 29, 2013.

* cited by examiner

TRUSTED GRAPHICS RENDERING FOR SAFER BROWSING ON MOBILE DEVICES

CROSS REFERENCE TO RELATED APPLICATIONS

The present disclosure is related to U.S. patent application Ser. No. 12/647,037, filed concurrently herewith, and entitled COLLABORATIVE MALWARE DETECTION AND PREVENTION ON MOBILE DEVICES.

FIELD

The present disclosure relates to trusted graphics rendering for safer browsing on mobile devices.

BACKGROUND

With the increasing popularity of mobile devices (e.g., smart telephones and other such wireless devices), more users are utilizing their mobile devices to access more and more different types of services over the Internet. For example, there is a trend towards allowing users to interact with banking services and/or networking sites using mobile devices. However, numerous security concerns arise when a user accesses the Internet using a mobile device. In particular, some websites may include malware and/or spyware which may be configured to capture confidential and/or sensitive information/data stored on and/or entered through a mobile device.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the following Detailed Description will proceed with reference being made to illustrative embodiments, many alternatives, modifications, and variations thereof will be apparent to those skilled in the art.

DETAILED DESCRIPTION

Generally, this disclosure describes a secure method and system for determining whether a URL ("uniform resource locator") accessed by a mobile device is "safe" or "unsafe". As used herein, "safe" corresponds to a URL that is not compromised, is on a white-list and/or is not on a black-list. As used herein, "unsafe" corresponds to a URL that is compromised, is not on a white-list and/or is on a black-list. Logos configured to indicate whether a URL is safe or unsafe are provided. The appropriate logo is displayed to a user as an overlay blended with rendered graphics displayed on the device. The method is implemented in secure circuitry and the logos, white-list and/or black-list are stored in secure memory on the device. The overlay is blended using overlay circuitry in a display controller and/or implemented in the secure circuitry. The secure circuitry and secure memory are inaccessible to "untrusted parties" including the user, operating system, applications and/or malware and may be only accessible through encrypted communication. Secure circuitry and secure memory are configured to provide protection against software attacks, protection of user secrets and/or secure storage. For example, cryptographic keys may be fused in the secure circuitry and/or secure memory. Secure circuitry is configured to provide a "trusted" computing base, i.e., a secure element on a computing device, that provides trusted/secure execution, storage and/or data channel(s).

Anti-virus detection methods may be implemented in software that runs on a processor along with an operating system and other applications. Malicious programs ("malware") may disable anti-virus programs. Malware may further mimic a security logo such as the locked padlock symbol. A user may then mistakenly rely on this symbol and enter sensitive user data such as password(s), credit card number(s), bank account number(s), personal identification number(s) (PINs), etc. Malware may also mimic, e.g., a banking website, so that the site appears to the user as the real banking website. The user may then enter such sensitive user data which the malware may then capture. Advantageously, the method and system disclosed herein provide a secure execution environment and secure storage configured to determine whether a URL is safe or unsafe. The method and system is further configured to display a safe logo or an unsafe/malware logo in a manner that cannot be mimicked by software as described herein.

As used herein, the term "mobile device" is intended to include any mobile device that is capable of accessing a network, including the Internet. For example, a mobile device may be a "mobile internet device" generally configured for wireless internet access in order to provide entertainment, information and/or location-based services for a user. Mobile devices may include "smart phones", "ultra mobile PCs", "Netbooks", and/or "notebook computers". A mobile device may support a variety of web browsers (such as, but not limited to, Internet Explorer™, Mozilla Firefox™, Google Chrome™, Apple Safari™, and Opera™ for Windows™ and Apple Safari™, Mozilla Firefox™ and Opera™ for Macintosh™) as well as web-based applications (e.g., but not limited to, banking/financial applications, social networking, network games, etc).

Figure 1:
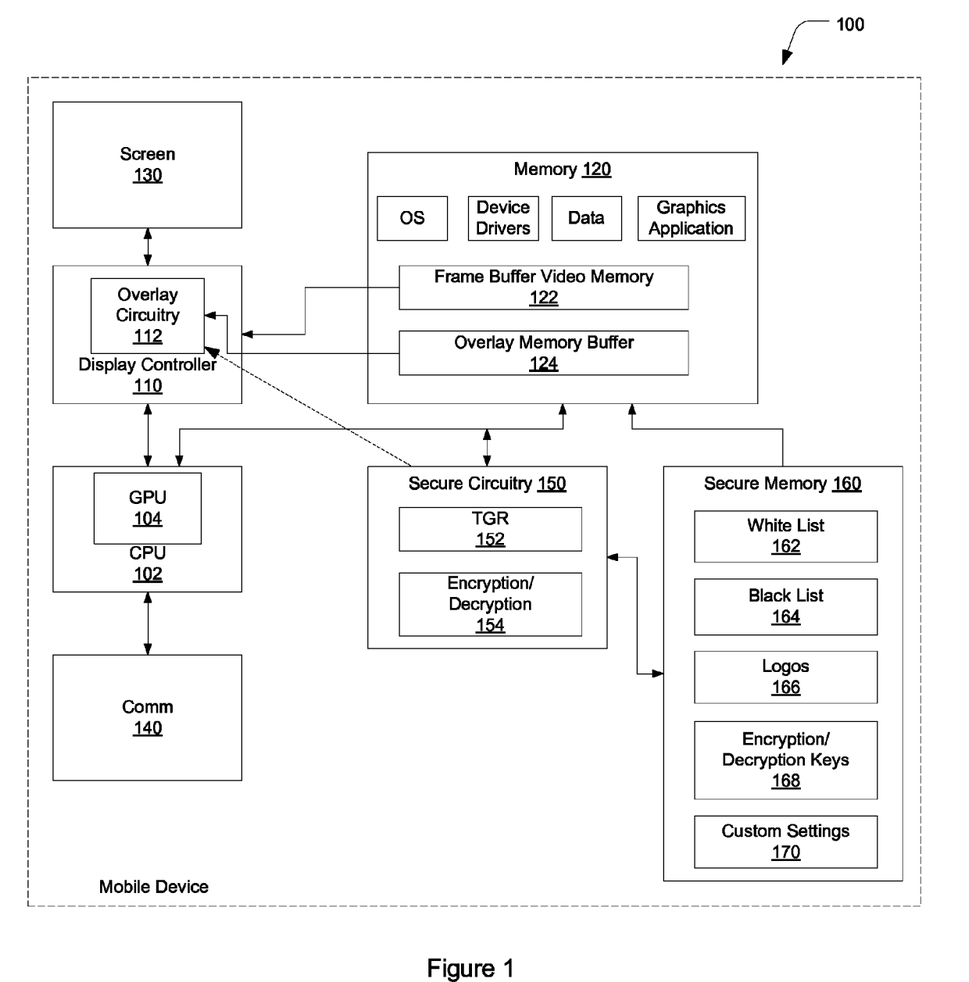
FIG. 1 illustrates one exemplary functional block diagram of a mobile device consistent with the present disclosure.

Turning now to FIG. 1, one exemplary functional block diagram of a mobile device consistent with the present disclosure is illustrated. The mobile device 100 includes a processor ("CPU") 102 coupled to host memory 120. The CPU 102 may include and/or be coupled to a graphics processing unit ("GPU") 104. The CPU 102 and/or GPU 104 may be coupled to a display controller 110. The display controller 110 is coupled to display/screen 130. The CPU 102 is configured to execute an operating system, device driver(s) and/or application(s) for the mobile device 100. The GPU 104 is configured to interface with display controller 110 to generate graphical images for display on screen 130. The host memory 120 is configured to store the operating system, device driver(s), application(s) and/or data associated with the application(s) for the mobile device 100. Applications may include web browsers, banking applications, social networking applications, and/or other applications known to those of skill in the art. The display controller 110 is configured to render graphics images to the screen 130. The screen 130 is configured to display graphics received from the display controller 110 to a user and/or to receive user inputs, e.g., touch.

The CPU 102 is further coupled to a communications system ("Comm") 140. The communications system 140 is configured to provide communication between the mobile device 100, a network and/or other mobile device(s). For example, Comm 140 may include a transmitter and a receiver (e.g., a transceiver) configured for wireless communication from/to the mobile device to/from the network and/or other mobile devices. Communication protocols may include WiFi, 3G, WiMax, Bluetooth, NFC (Near Field Communication), and/or other protocols known to those skilled in the art. The communication may be encrypted. Encryption protocols may include DES (Data Encryption Standard), AES (Advanced Encryption Standard), WAP (Wireless Application Protocol), WEP (Wired Equivalent Privacy), and/or other encryption protocols known to those skilled in the art. Comm 140 may be configured to provide global positioning, i.e., via the Global Positioning System (GPS), which may be used for location-based services.

The mobile device 100 includes secure circuitry 150 coupled to secure memory 160. In some embodiments, secure circuitry 150 may include and/or be associated with secure memory 160. The secure circuitry 150 is coupled to CPU 102 and host memory 120. Secure circuitry 150 (and secure memory 160) is configured to provide a secure execution environment for security functions including, e.g., trusted graphics rendering 152 and/or encryption/decryption 154, as described herein. The secure memory 160 is configured to store data associated with the security functions. For example, secure memory 160 may store a white-list 162 and/or a black-list 164, and/or key(s) for encryption/decryption 168. As used herein, a "white-list" is a list of URLs that are considered to be safe for the mobile device to access. As used herein, a "black-list" is a list of URLs that are considered to be compromised and/or associated with malware, i.e., that are unsafe for the mobile device to access. The categorization of the URLs in the white-list and/or black-list may be determined and/or updated by a third party, as described herein. For example, a URL which includes malware (such as, but not limited to, virus applications and/or applications configured to mimic a web site) may be categorized as compromised URL and may therefore be listed on the black-list. A URL which has been verified and/or qualified as not containing any malware may be categorized as a safe URL and may therefore be listed on the white-list.

The secure memory 160 is further configured to store information representing at least one logo 166. As used herein, a logo is a graphical representation configured to indicate whether a requested URL is safe, unsafe or potentially unsafe. A logo may include text, symbols, and/or images or indicia which may be recognized by a user. A safe logo may be displayed to indicate to a user that a requested URL has been determined to be uncompromised, on the white-list 162 and/or not on the black-list 164. A malware (unsafe) logo may be displayed to a user to indicate that a requested URL has been determined to be compromised, not on the white-list 162 and/or on the black-list 164. Trusted graphics rendering 152, executing in secure circuitry 150, is configured to make these determinations as will be discussed in more detail below. Secure circuitry 150 is configured to provide encryption and/or decryption functions, hashing and/or other security related functionality 154.

The secure memory 160 is configured to store custom settings 170. Custom settings 170 may include enable/disable trusted graphics rendering, enable/disable white-list and/or black-list, user selected location for logo display on screen 130, enable/disable random logo location on screen 130, and/or enable/disable custom logos. For example, custom settings 170 may be initialized by a provider of the mobile device 100. Custom settings 170 may be changed in cooperation with an administrator. In order to preserve security, a user of the mobile device 100 may not independently change user settings 170.

The host memory 120 includes frame buffer video memory 122 configured to store frames associated with video and/or graphics for display on screen 130 by display controller 110. An overlay memory buffer 124 may be included in the host memory 120 or in the secure circuitry 150 and may be configured to store a logo retrieved from secure memory 160. The retrieved logo may then be provided to overlay circuitry 112 for compositing (blending) onto rendered graphics for display on screen 130. The overlay memory buffer 124 may be only accessible to the overlay circuitry 112 and/or the secured circuitry 150. Overlay circuitry 112 is configured to superimpose overlay content, e.g., the retrieved logo, with other content, e.g., based on data in the frame buffer video memory, to be displayed via the display controller 110. In some embodiments, the overlay circuitry 112 may be specific to the display controller 110. The overlay circuitry 112 may provide a blending quality that may not be achieved by software, e.g., malware, as described herein.

Secure circuitry 150, secure memory 160, trusted graphics rendering 152, and the white-list 162 and/or black-list 164 and logos 166 are configured to provide a secure indicator to a user that a requested URL is safe, not safe or potentially unsafe. The secure circuitry 150 and secure memory 160 are configured to be inaccessible to the user, operating system and/or applications thereby providing a relatively high level of security. Overlay circuitry 112 is configured to blend the logo with rendered graphics from/in the display controller 110 in a manner that software cannot mimic. For example, the blending of the logo with the rendered graphics cannot be recreated in software because the overlay memory buffer is not accessible to software (including the OS). In addition, the overlay circuitry 112 may be specifically designed to do the blending of the overlay content with the primary display and software cannot accomplish this without physical artifacts. In this manner, malware may be unable to compromise trusted graphics rendering 152, white-list 162, black-list 164 and/or logos 166 stored in secure memory 160, and/or overlay circuitry 112.

In some embodiments (for example, web browsers that are "modular"), the secure circuitry 150 may be configured to execute a URL resolver component of the modular browser. The URL resolver is configured to identify a protocol, e.g., HTTP, HTTPS, FTP, etc., an IP address and/or a path of the content, e.g., a file, to be fetched. A monolithic web browser provides a single protection domain that includes both a user and the web. In such browsers, a vulnerability in the browser may be exploited to allow an attacker to access a user's mobile device with the user's privileges. In a modular browser, a plurality of protection domains may be provided with particular browser "modules" operating in separate protection domains. The separate protection domains may provide a degree of security not available with monolithic browsers. Executing the URL resolver component in secure circuitry may afford a higher degree of protection, i.e., resistance to attack.

Figure 2:
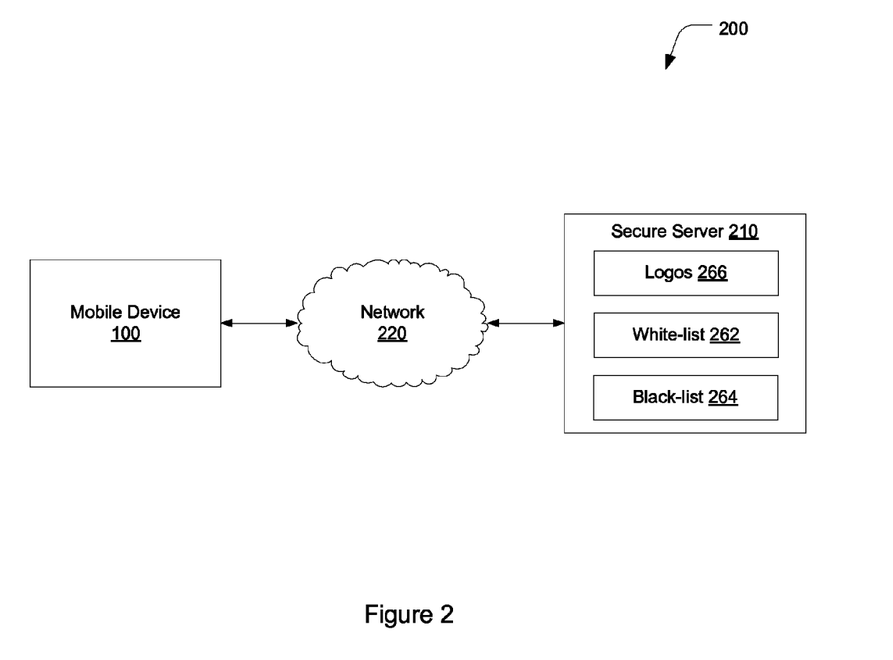
FIG. 2 illustrates an example of a mobile device consistent with the present disclosure coupled to a server via a network.

FIG. 2 illustrates an example of a system 200 including a mobile device 100 coupled to a secure server 210 via a network 220. Network 220 may include a plurality of other servers and/or a plurality of wired and/or wireless interconnects between the other servers. A plurality of other devices, including other mobile devices, may be coupled to the network 220. Secure server 210 is configured to store white-list (s) 262, black-list(s) 264 and/or logos 266, as described herein. The system 200 is configured to facilitate updating capabilities for the white-list 162 and/or black-list 164 stored in secure memory 160 of mobile device 100, as will be described in more detail below. The system 200 is further configured to facilitate verification of a logo 166 and/or overlay, as will be described in more detail below.

Figure 3:
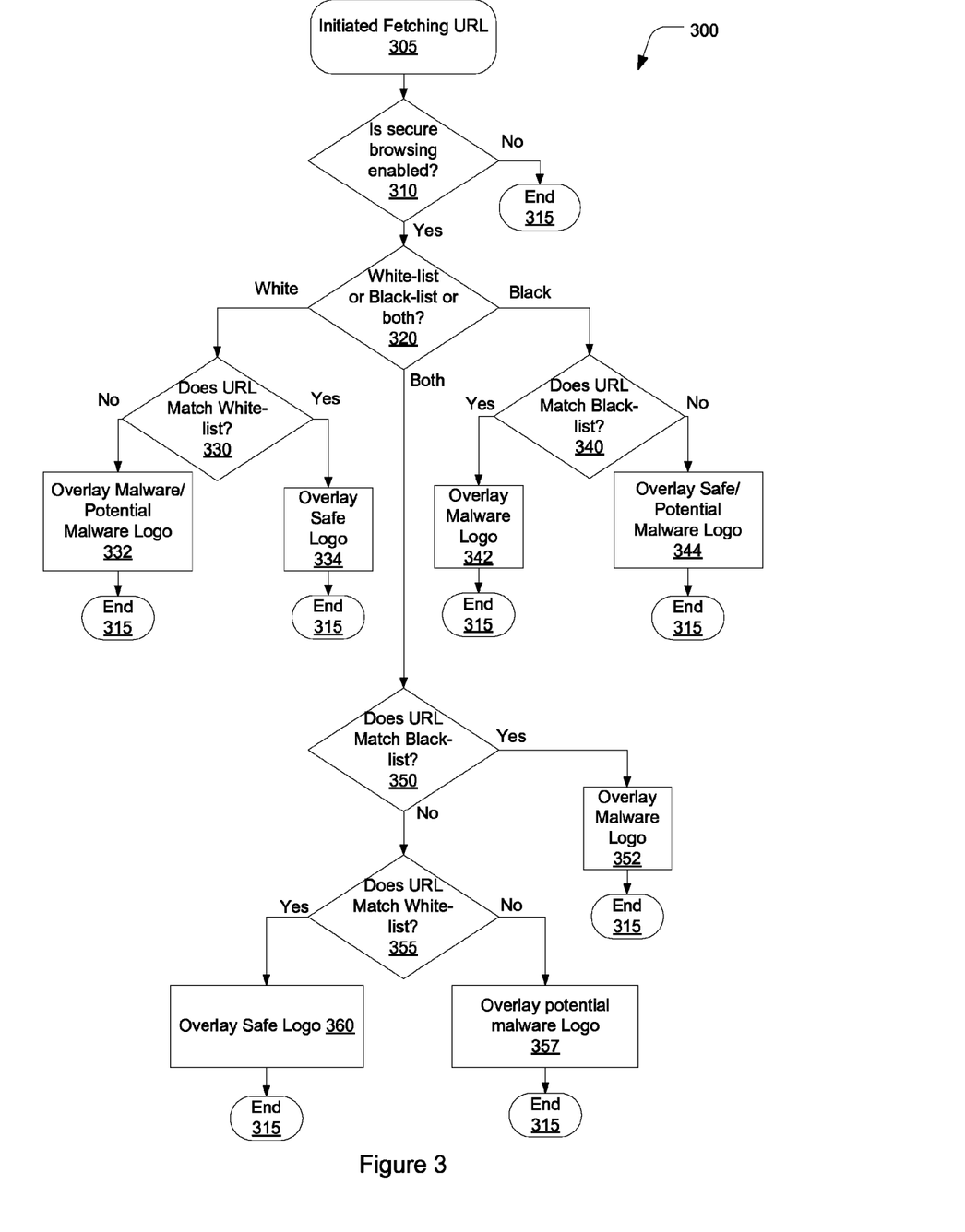
FIG. 3 depicts an exemplary flow chart illustrating trusted graphics processing consistent with the present disclosure.

FIG. 3 depicts an exemplary flow chart illustrating one embodiment of trusted graphics processing consistent with the present disclosure. The operations illustrated in this embodiment may be performed by secure circuitry, e.g., secure circuitry 150, and/or modules operating therein. Flow may begin when fetching a URL is initiated, operation 305. For example, a user may initiate fetching a URL using screen 130 of mobile device 100. At operation 310, whether secure browsing is enabled may be determined. For example, secure browsing may be enabled or disabled using a user setting 170. If secure browsing is not enabled, flow may end at operation 315. If secure browsing is enabled, whether a white-list 162, a black-list 164 or both the white-list 162 and the black-list 164 are enabled may be determined at operation 320. As described herein, a white-list 162 includes URLs determined to be safe and a black-list 164 includes URLs determined to be unsafe. Evaluating a requested URL using a white-list 162 may provide a relatively higher level of security compared to using a black-list 164 but may be relatively more limiting compared to using a black-list 164. In other words, when using a white-list 162, only requested URLs that are on the white-list 162 are deemed "safe"; a requested URL not on the white-list 162 is deemed unsafe. When using a black-list 164, a requested URL not on the black-list 164 is deemed safe; only those on the black-list 164 are deemed unsafe. Whether the white-list 162 and/or black-list 164 are enabled may be determined based on a custom setting 170.

If a white-list 162 is enabled, whether the requested URL matches an entry on the white-list 162 may be determined at operation 330. For example, trusted graphics rendering 152 in secure circuitry 150 may compare the requested URL to the white-list 162 stored in secure memory 160. If the requested URL does not match an entry in the white-list 162, operation 332 may include displaying a malware logo and/or a potential malware logo overlay on screen 130. The malware logo 166 is configured to indicate to the user that the requested URL is unsafe and the potential malware logo is configured to indicate to the user that the safety of the requested URL cannot be verified. Whether a malware and/or potential malware logo is overlaid may be determined based on the custom settings 170. If the requested URL matches an entry in the white-list 162, operation 334 includes displaying a safe logo overlay on screen 130. The safe logo 166 is configured to indicate to the user that the requested URL is safe. Flow may then end at operation 315.

If a black-list is enabled, whether the requested URL matches an entry on the black-list 164 may be determined at operation 340. For example, trusted graphics rendering 152 in secure circuitry 150 may compare the requested URL to the black-list 164 stored in secure memory 160. If the requested URL matches an entry in the black-list 164, operation 342 may include displaying a malware logo overlay on screen 130, indicating to the user that the requested URL is unsafe. If the requested URL does not match an entry in the black-list 164, operation 344 includes displaying a safe logo overlay on screen 130, configured to indicate to the user that the requested URL is safe and/or a potential malware logo overlay on screen 130 configured to indicate to the user that the safety of the requested URL cannot be verified. Whether a safe logo or potential malware logo is overlaid may be determined based on the custom settings 170. Flow may then end at operation 315.

If both the white-list 162 and the black-list 164 are enabled, whether the URL matches an entry on the black-list 164 stored in secure memory 160 may be determined at operation 350. If the URL matches an entry in the black-list 164, operation 352 may include displaying a malware logo overlay on screen 130, indicating to user that the requested URL is unsafe. Flow may then end at operation 315. If the URL does not match an entry in the black-list 164, whether the URL matches an entry in the white-list 162 may be determined at operation 355. If the URL matches an entry in the white-list 162, operation 360 may include displaying a safe logo overlay on screen 130, indicating to user that the requested URL is safe. Flow may then end at operation 315. If the URL does not match an entry in the white-list 162, operation 357 may include displaying a potential malware logo overlay on screen 130. The potential malware logo is configured to indicate to the user that although the requested URL is not on the black-list 164, it is not on the white-list 162 and the safety of the URL cannot be verified. Flow may then end at operation 315.

In this manner, using a white-list 162 and/or a black-list 164 stored in secure memory 160, trusted graphics rendering 152, executing in secure circuitry 150 is configured to analyze a requested URL by comparing the requested URL to a white-list 162 and/or a black-list 164. Based on the comparison, a safe logo, unsafe logo or potentially unsafe/malware logo 166 may be displayed to a user as an overlay. As described herein, the logos are stored in secure memory 160. The appropriate logo may be provided to the overlay memory buffer 124 in host memory 120. The overlay circuitry 112 may then blend the logo onto rendered graphics for display on screen 130. The rendered graphics may include rendered data from frame buffer video memory 122. The overlay circuitry 112 may be controlled by trusted graphics rendering 152 executing in secure circuitry 150. The overlay circuitry 112 may be configured to blend the logo and rendered graphics in a manner that malware cannot reproduce as described herein. The secure circuitry 150, secure memory 160 and overlay circuitry 112 are configured to provide a secure environment for analyzing whether a requested URL is safe or unsafe and displaying the results to the user.

Figure 4:
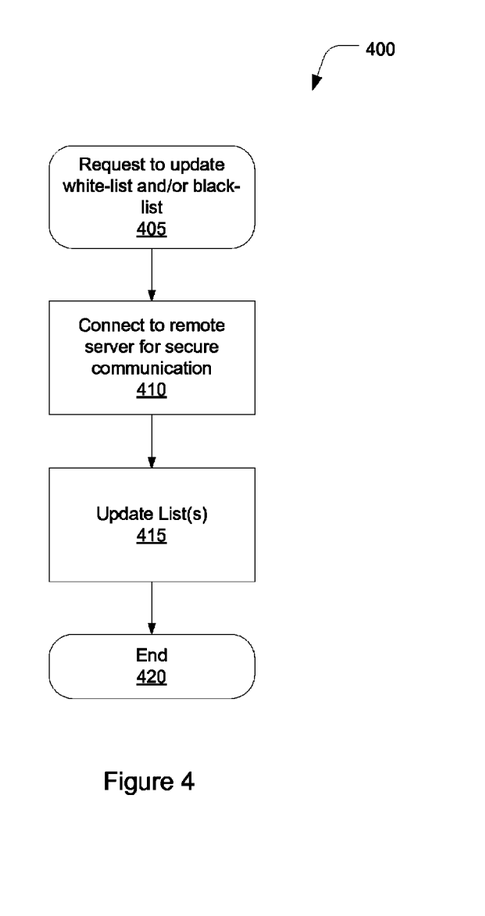
FIG. 4 depicts an exemplary flow chart illustrating updating a white and/or black list consistent with the present disclosure.

FIG. 4 depicts an exemplary flow chart illustrating updating a white-list and/or black-list consistent with the present disclosure. The operations illustrated in this embodiment may be performed by secure circuitry, e.g., secure circuitry 150, and/or modules operating therein. An initiating operation may be performed by a remote server and/or a user. Flow may begin when a request to update a white-list and/or a black-list is initiated 405. For example, a user may request updating the white-list and/or black-list by selecting a user option displayed on screen 130. In another example, a secure remote server, e.g., secure server 210, may send a request to a user when updates are available. In yet another example, secure server 210 may initiate the update with mobile device 100 without sending a request to the user. Mobile device 100 may be connected to remote server 210 for secure communication at operation 410 (if it is not already connected). As used herein, "connected" means establishing a communication channel between mobile device 100 and server 210. The communication channel may include wired and/or wireless links and/or other servers, as described with respect to FIG. 2. As used herein, "secure communication" means transmitted and/or received signals and/or data included in the transmitted and/or received signals using the communication channel are encrypted, using one or more encryption protocols as described herein. Operation 415 includes updating the white-list and/or the black-list. For example, updated list(s) may be provided from secure server 210 to mobile device 100 in an encrypted form. Trusted graphics rendering 152 may be configured to receive the encrypted list(s), to decrypt the list(s) and to store the decrypted list(s) in secure memory 160. Trusted graphics rendering 152 may then utilize the updated list(s) for determining whether a URL is safe or not. Flow may then end at operation 420.

Figure 5:
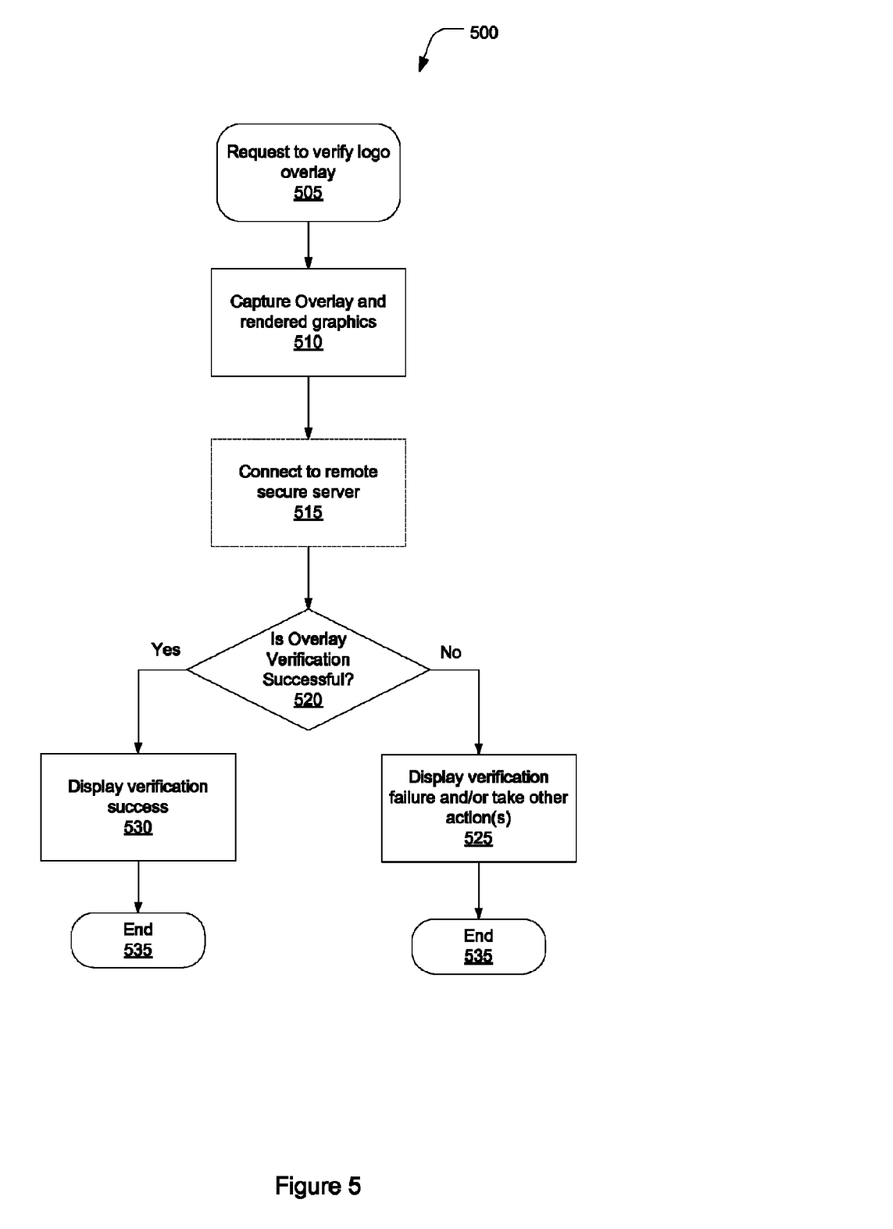
FIG. 5 depicts an exemplary flow chart illustrating verifying a overlay consistent with the present disclosure.

FIG. 5 depicts an exemplary flow chart illustrating verifying an overlay consistent with the present disclosure. The operations illustrated in this embodiment may be performed by secure circuitry, e.g., secure circuitry 150, and/or modules operating therein. An initiating operation may be performed by the secure server 210 and/or a user. Flow may begin when a request to verify a logo overlay is initiated 505. For example, a trusted graphics rendering 152 may be configured to request verification at a random time, using, e.g., a random number generator executing in secure circuitry 150. In another example, a secure remote server, e.g., secure server 210, may send a request for verification to mobile device 100. In this example, secure server 210 may securely connect to mobile device 100 in order to send the request for verification.

Operation 510 includes capturing the combined logo overlay and rendered graphics. For example, trusted graphics rendering 152 may retrieve a composited (blended) image from display controller 110 that includes the logo and the rendered graphics. The retrieved blended image may then be provided to secure server 210. For example, trusted graphics rendering 152 may provide the retrieved blended image to secure server 210 using a secure signal, i.e., using encryption. At operation 515, mobile device 100 may connect to secure server 210. This operation is dotted in the figure to indicate that it may not be done. For example, if the secure server 210 initiated the verification, the mobile device 100 may already be connected to the secure server 210.

Whether the verification was successful may be determined at operation 520. For example, the requested URL and the captured overlay and rendered graphics may be transmitted to remote secure server 210. Secure server 210 may then determine whether the received requested URL matches an entry in the white-list 262 or the black-list 264 stored in secure server 210. Based on this determination, secure server 210 may then retrieve an appropriate logo from the logos 266 stored in secure server 210. For example, if the requested URL matches an entry in the white-list 262, a safe logo may be retrieved. If the requested URL matches an entry in the black-list 264, an unsafe logo may be retrieved. If the requested URL does not match an entry in the white-list 262 and does not match an entry in the black-list 264, the potentially unsafe logo may be retrieved. The secure server 210 is configured to compare the retrieved logo with the captured overlay and rendered graphics received from mobile device 100. For example, an image processing algorithm may be used to determine whether the retrieved logo differs significantly from the logo in the captured overlay and rendered graphics image. If so, then verification fails, otherwise, verification is successful.

The secure server 210 may be configured to provide a verification success or verification failure indicator to trusted graphics rendering 152 executing in secure circuitry 150. Based on this indicator, trusted graphics rendering 152 may determine whether verification was successful. If verification failed, a user may be alerted and/or other action(s) may be taken at operation 525. For example, a verification failure logo may be composited on rendered graphics for display to user on screen 130. In another example, user may be alerted by a message, e.g., electronic mail, sent to mobile device 100 from remote server 210. Other possible notification methods may be used as are known to those skilled in the art. The other action(s) taken may depend on custom settings 170. Other action(s) may include shutting down and restarting the mobile device 100, resetting a security function, e.g. trusted graphics rendering 152, and/or "locking" mobile device 100 to prevent further operation. Flow may then end at operation 535. If verification was successful, a user may be notified at operation 530. A user may be notified as described in the examples described above with respect to verification failure. Flow may then end at operation 535.

The system and/or method described herein are configured to provide a secure environment in a mobile device for analyzing whether a requested URL is safe or unsafe. The system and/or method are further configured to provide the result to a user in the form of a safe or unsafe logo blended with rendered graphics displayed to the user. The system and/or method are configured to update a white-list and/or a black-list and/or to verify an overlay. The method may be implemented in a secure environment that is not accessible by the user, operating system, other applications and/or malware. Displaying a safe or unsafe logo may also provide security using the overlay circuitry to blend the logo with the rendered graphics.

While the foregoing is prided as exemplary system architectures and methodologies, modifications to the present disclosure are possible. For example, an operating system in host memory 120 may manage system resources and control tasks that are run on, e.g., CPU 102. For example, the OS may be implemented using Linux™ and/or may be Linux-based, e.g., Moblin™ (Mobile Linux™), Android™ (a mobile operating system running on the Linux™ kernel), Microsoft Windows™ based, e.g., Microsoft Windows CE™, Apple™ Mac-based and/or another operating system designed for use on mobile devices, e.g., Symbian, although other operating systems may be used.

As described herein, communication protocols may include WiFi, 3G, WiMax, Bluetooth, and/or NFC. Other communications protocols may be used. WIFI is a registered trademark of the Wi-Fi Alliance. The WiFi protocol may comply or be compatible with the wireless standard published by the Institute of Electrical and Electronics Engineers (IEEE) titled "IEEE 802.11 Standard", published in 1997, e.g., 802.11a, 802.11b, 802.11g, 802.11n, and/or later versions of this standard. The WiMax protocol may comply or be compatible with the wireless standard published by the IEEE titled "IEEE 802.16 Standard", published in December, 2001, and/or later versions of this standard. The 3G protocol may comply or be compatible with the mobile telecommunication 3GPP specification published by the International Telecommunications Union in 1998, and/or later releases of this specification. The Bluetooth protocol may comply or be compatible with the wireless standard published by the IEEE titled "IEEE 802.15.1-2002", and/or later versions of this standard. The NFC ("Near Field Communication") protocol may comply or be compatible with standards ECMA-340 and ISO/IEC 18092 published by International Electrotechnical Commission of the International Organization for Standardization on Dec. 8, 2003, and/or later versions of these standards.

As described herein, encryption protocols may include DES, AES, WAP, WEP, and/or TLS. Other encryption protocols may be used. The DES protocol may comply or be compatible with the Data Encryption Standard, titled FIPS standard FIPS PUB 46 published by the National Bureau of Standards (now the National Institute of Standards and Technology ("NIST")) in 1976, and/or later versions of this standard. The AES protocol may comply or be compatible with the Advanced Encryption Standard, titled U.S. FIPS PUB 197 (FIPS 197), published by the NIST on Nov. 26, 2001, and/or later versions of this standard. The WAP protocol may comply or be compatible with the Wireless Application Protocol standard, titled "WAP 1.0 Specification Suite", published by the Open Mobile Alliance, April 1998, and/or later versions of this standard. The WEP ("Wired Equivalent Privacy") protocol may comply or be compatible with the IEEE Standard 802.11, and/or later versions of this standard. The TLS (Transport Layer Security) protocol may comply or be compatible with the standard titled "The TLS Protocol Version 1.0", published by the Internet Engineering Task Force "IETF" on January 1999, and/or later versions of this standard.

Other modifications are possible. For example, host memory, e.g., host memory 120 may comprise one or more of the following types of memory: semiconductor firmware memory, programmable memory, non-volatile memory, read only memory, electrically programmable memory, random access memory, flash memory, magnetic disk memory, and/or optical disk memory. In another example, secure memory, e.g., secure memory 160, may comprise one or more of the following types of memory: semiconductor firmware memory, programmable memory, non-volatile memory, read only memory, electrically programmable memory, random access memory and/or flash memory. Either additionally or alternatively, host memory 120 and/or secure memory 160 may comprise other and/or later-developed types of computer-readable memory. Secure memory 160 may also include direct memory access (DMA) memory.

Embodiments of the methods described herein may be implemented in a system that includes one or more storage mediums having stored thereon, individually or in combination, instructions that when executed by one or more processors perform the methods. Here, the processor may include, for example, a processing unit and/or programmable circuitry. A processor may include one or more "cores". Thus, it is intended that operations according to the methods described herein may be distributed across a plurality of physical devices, such as processing structures at several different physical locations. The storage medium may include any type of tangible medium, for example, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

The Ethernet communications protocol, described herein, may be capable permitting communication using a Transmission Control Protocol/Internet Protocol (TCP/IP). The Ethernet protocol may comply or be compatible with the Ethernet standard published by the Institute of Electrical and Electronics Engineers (IEEE) titled "IEEE 802.3 Standard", published in March, 2002 and/or later versions of this standard.

"Circuitry", as used in any embodiment herein, may comprise, for example, singly or in any combination, hardwired circuitry, programmable circuitry, state machine circuitry, and/or firmware that stores instructions executed by programmable circuitry.

According to one embodiment, the present disclosure may feature an apparatus comprising overlay circuitry, secure memory and secure circuitry. Secure memory may be configured to host at least one database comprising a plurality of uniform resource locators (URLs). The secure memory may also be configured to host information representing at least one logo. The logo may be indicative of a safety level of the plurality of URLs of database. The secure circuitry may be configured to compare a requested URL with the database to determine if the requested URL corresponds to one of the plurality of URLs of database and to select an appropriate logo stored in the secure memory. The secure circuitry may also be further configured to direct the overlay circuitry to blend the appropriate logo onto rendered data from a frame buffer video memory.

According to another embodiment, the present disclosure may feature a system comprising a mobile device. The mobile device may comprise a transceiver configured to wirelessly communicate with a network and to access data across the network based on a requested uniform resource locator (URL) and host memory comprising a frame buffer video memory. A processor may be coupled to the host memory and configured to execute an operating system stored on the host memory. A display controller may be configured to render graphics images to a display representing the requested URL. Secure memory may be configured to host at least one database comprising a plurality of URLs. The secure memory may also be configured to host information representing at least one logo. The logo may be indicative of a safety level of the plurality of URLs of the database. Secure circuitry may be configured to compare the requested URL with the database to determine if the requested URL corresponds to one of the plurality of URLs of the database and to select an appropriate logo from the secure memory. The secure circuitry may be further configured to direct the overlay circuitry to blend the appropriate logo onto rendered data from the frame buffer video memory for display on the display.

According to yet another embodiment, the present disclosure may feature a method for determining a safety level of a requested uniform resource locator (URL). The method comprises determining, via secure circuitry, whether the requested URL corresponds to a URL stored in at least one database hosted on secure memory. The method may also include selecting, via the secure circuitry, an appropriate logo from the logo stored in the secure memory based on the determination of the requested URL. The logo may be indicative of a safety level of the plurality of URLs of the database. The method may further include directing, via the secure circuitry, overlay circuitry to blend the appropriate logo onto rendered data from a frame buffer video memory and displaying the blended appropriated logo and rendered data to a user.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

What is claimed is:

1. An apparatus comprising:
overlay circuitry;
overlay memory buffer;

secure memory configured to host a database comprising a plurality of uniform resource locators (URLs), the secure memory also configured to host information representing at least one logo, the at least one logo indicative of a safety level of the plurality of URLs of the at least one database; and secure circuitry configured to compare a requested URL with the database to determine if the requested URL corresponds to one of the plurality of URLs of the at least one database, to select a logo stored in the secure memory, and to store the selected logo in the overlay memory buffer, the secure circuitry further configured to direct the overlay circuitry to retrieve the selected logo from the overlay memory buffer and blend the selected logo onto rendered data from a frame buffer video memory without the use of software applications;

wherein said secure memory and said secure circuitry are protected from being directly accessed by a user, operating system, or the software applications running on said apparatus; and wherein the overlay memory buffer is only accessible to at least one of the overlay circuitry or the secure circuitry.

2. The apparatus of claim 1, wherein the secure memory further comprises at least one encryption/decryption key and wherein the secure circuitry is further configured to utilize the encryption/decryption key to perform at least one encryption or decryption functions.

3. The apparatus of claim 1, wherein the database comprises at least one white-list or black-list, wherein the white-list comprises a listing of safe URLs and the black-list comprises a listing of unsafe URLs.

4. The apparatus of claim 3, wherein the secure circuitry is configured to determine if the requested URL corresponds to a URL within at least one of the white-list and the black-list.

5. The apparatus of claim 4, wherein the secure circuitry is further configured to provide a safe logo to the overlay circuit if the requested URL corresponds to a URL within the white-list or provide a malware logo to the overlay circuit if the requested URL corresponds to a URL within the black-list.

6. The apparatus of claim 5, wherein the secure circuitry is further configured to provide a potential malware logo to the overlay circuit if the requested URL does not corresponds to a URL within the white-list and the black-list.

7. A system comprising a mobile device, the mobile device comprising:
    overlay circuitry;
    overlay memory buffer;
    a transceiver configured to wirelessly communicate with a network and to access data across the network based on a requested uniform resource locator (URL);
    host memory comprising a frame buffer video memory;
    a processor coupled to the host memory, the processor configured to execute an operating system stored on the host memory;
    a display controller configured to render graphics images to a display representing the requested URL;
    secure memory configured to host a database comprising a plurality of URLs, the secure memory also configured to host information representing at least one logo, the at least one logo indicative of a safety level of the plurality of URLs of the at least one database; and secure circuitry configured to compare a requested URL with the database to determine if the requested URL corresponds to one of the plurality of URLs of the at least one database, to select a logo stored in the secure memory, and to store the selected logo in the overlay memory buffer, the secure circuitry further configured to direct the overlay circuitry to retrieve the selected logo from the overlay memory buffer and blend the selected logo onto rendered data from the frame buffer video memory without the use of software applications;

wherein said secure memory and said secure circuitry are protected from being directly accessed by a user, operating system, or the software applications running on said apparatus; and wherein the overlay memory buffer is only accessible to at least one of the overlay circuitry or the secure circuitry.

8. The system of claim 7, wherein the mobile device is selected from the group consisting of a smart phone, ultra mobile personal computer, mobile internet device and a netbook.

9. The system of claim 7, wherein the host memory comprises the overlay memory buffer and wherein the display controller includes the overlay circuitry.

10. The system of claim 7, wherein the database comprises at least one white-list or black-list, wherein the white-list comprises a listing of safe URLs and the black-list comprises a listing of unsafe URLs.

11. The system of claim 10, wherein the secure circuitry is configured to determine if the requested URL corresponds to a URL within at least one of the white-list and the black-list.

12. The system of claim 11, wherein the secure circuitry is further configured to provide a safe logo to the overlay circuit if the requested URL corresponds to a URL within the white-list or provide a malware logo to the overlay circuit if the requested URL corresponds to a URL within the black-list.

13. The system of claim 12, wherein the secure circuitry is further configured to provide a potential malware logo to the overlay circuit if the requested URL does not corresponds to a URL within the white-list and the black-list.

14. A method for determining a safety level of a requested uniform resource locator (URL) using a mobile device, the method comprising:
    determining, via secure circuitry protected from being directly accessed by a user, operating system, or software applications running on said mobile device, whether the requested URL corresponds to a URL stored in a database hosted on secure memory;
    selecting, via the secure circuitry protected from being directly accessed by said user, operating system, or software applications running on said mobile device, a logo stored in the secure memory based on the determination of the requested URL, the selected logo being indicative of a safety level of the plurality of URLs of the at least one database;
    storing the selected logo in an overlay memory buffer, the overlay memory buffer is only accessible to at least one of the overlay circuitry or the secure circuitry;
    directing, via the secure circuitry, the overlay circuitry to retrieve the selected logo from the overlay memory buffer and blend the selected logo onto rendered data from a frame buffer video memory without the use of the software applications; and
    displaying the blended logo and rendered data to a user.

15. The method of claim 14, wherein determining whether the requested URL corresponds to a URL stored in the database comprises determining whether the requested URL corresponds to a URL stored in at least one white-list or black-list, wherein the white-list comprises a listing of safe URLs and the black-list comprises a listing of unsafe URLs.

16. The method of claim 15, further comprising providing a safe logo to the overlay circuit if the requested URL corresponds to a URL within the white-list or providing a malware logo to the overlay circuit if the requested URL corresponds to a URL within the black-list.

17. The method of claim 16, further comprising determining whether the requested URL does not correspond to a URL within the white-list and the black-list.

18. The method of claim 17, further comprising providing a potential malware logo to the overlay circuit if the requested URL does not corresponds to a URL within the white-list and the black-list.

19. A system comprising one or more computer readable storage memories having stored thereon, individually, or in combination, instructions that when executed by one or more processors of a mobile device results in the following operations:
- determining, via secure circuitry protected from being directly accessed by a user, operating system, or software applications running on said mobile device, whether a requested URL corresponds to a URL stored in a database hosted on secure memory;
- selecting, via the secure circuitry protected from being directly accessed by said user, operating system, or software applications running on said mobile device, a logo stored in the secure memory based on the determination of the requested URL, the selected logo being indicative of a safety level of the plurality of URLs of the at least one database;
- storing the selected logo in an overlay memory buffer, the overlay memory buffer is only accessible to at least one of the overlay circuitry or the secure circuitry;
- directing, via the secure circuitry, the overlay circuitry to retrieve the selected logo from the overlay memory buffer and blend the selected logo onto rendered data from a frame buffer video memory without the use of the software applications; and
- displaying the blended logo and rendered data to a user.

20. The system of claim 19, wherein the instructions that when executed by one or more processors result in determining whether the requested URL corresponds to a URL stored in the database further comprises determining whether the requested URL corresponds to a URL stored in at least one white-list or black-list, wherein the white-list comprises a listing of safe URLs and the black-list comprises a listing of unsafe URLs.

21. The system of claim 20, wherein the instructions that when executed by one or more processors result in the following additional operations comprising:
- providing a safe logo to the overlay circuit if the requested URL corresponds to a URL within the white-list or providing a malware logo to the overlay circuit if the requested URL corresponds to a URL within the black-list.

* * * * *